March 27, 1956
E. SOKOLIK
2,739,409
ANGLING BAG
Filed March 17, 1951
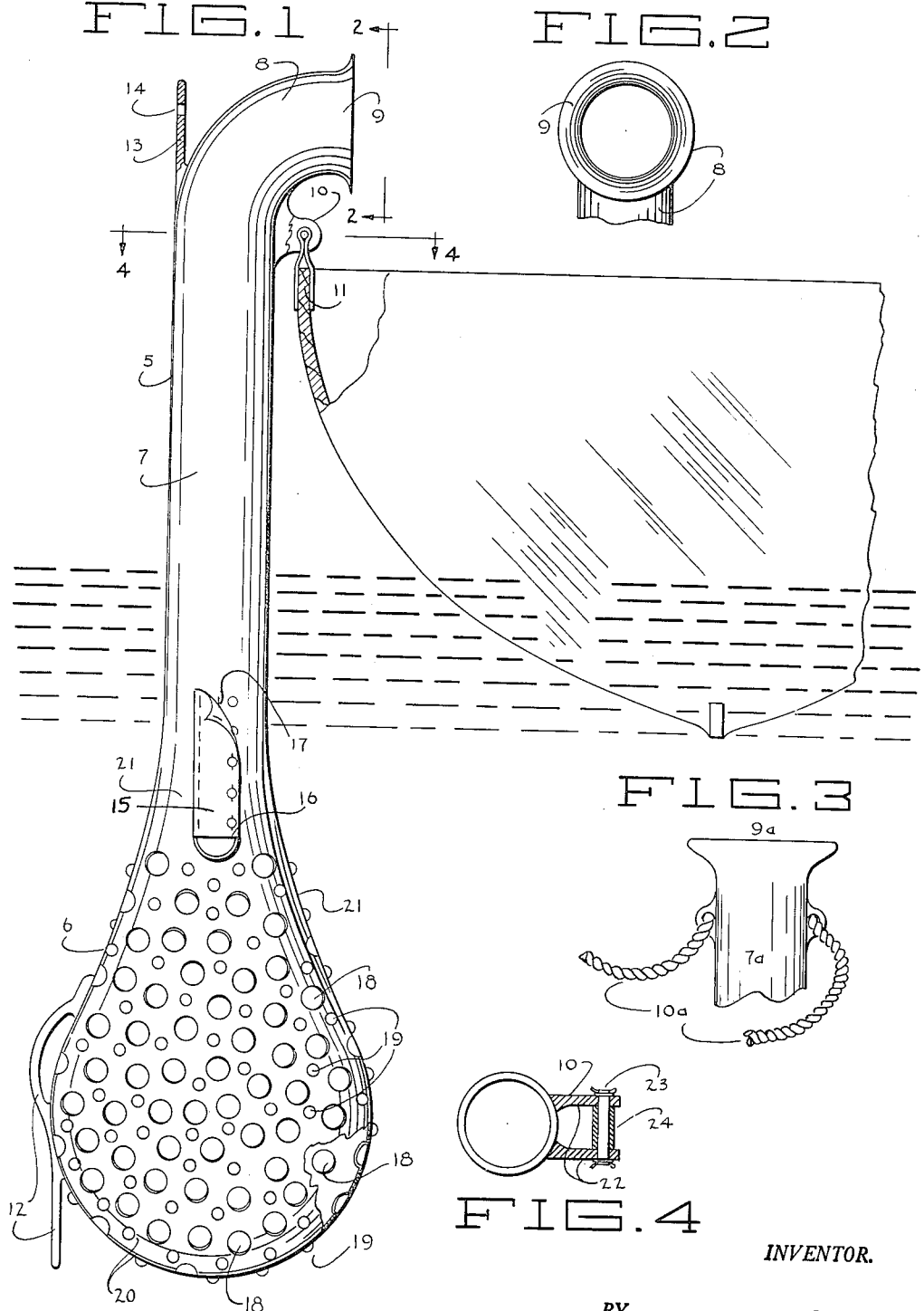
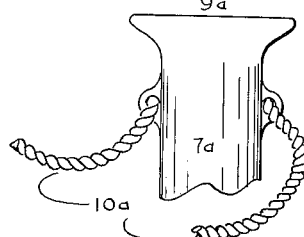
INVENTOR.
BY Edward Sokolik United States Patent Office 2,739,409
Patented Mar. 27, 1956

2,739,409

ANGLING BAG

Edward Sokolik, New Brighton, Minn.

Continuation of application Serial No. 746,781, May 8, 1947. This application March 17, 1951, Serial No. 216,177

6 Claims. (Cl. 43—55)

My present invention is a continuation of my application filed May 8, 1847, Serial No. 746,781, now abandoned, and relates to improvements in angling bags for use in connection with boats and the like and the objects are:

First, to provide a bag adapted to conduce to the comfort of the fish to keep them alive;

Second, to provide a bag adapted to be submerged in water alongside a boat and the like and to be anchored to the gunwale thereof;

Third, to provide a bag adapted to permit free circulation of water therethrough to provide oxygen for the fish, but adapted to prevent the fish escaping from the bag;

Fourth, to provide a bag provided with a pair of elements for hanging up and for handling the bag and provided with auxiliary means for opening the bag to put thereinto or take out therefrom oversize fish;

Fifth, to provide a bag adapted for conveying fish thereinto with one hand, and if the fish wriggles out of hand, it will drop into the bag or into the boat.

Sixth, to provide a bag that is more or less elastic, impervious to water or fish odor, and tangle resistant;

Seventh, to provide a bag adapted for aerating the fish in the bag out of water and for preventing dirt contacting the fish when the bag with the fish is handled out of water; and Eighth, to provide a bag adapted for durability, attractiveness and convenience of handling.

To attain the aforementioned objects, and advantages, I employ an angling bag made of elastic material such as rubber or other plastic, or of rubberized fabric constructed in the form of a combined pouch for the fish and a neck-portion extending from the pouch and affording a throat, whereby to convey the caught fish into the pouch.

Another feature of this angling bag is the preferable design whereby the pouch is submerged in water alongside a boat and the neck-portion extended therefrom up to the vicinity of the gunwale of the boat and anchored thereto.

A feature of the neck-portion is the provision of a preferably flared pliable open mouth, but preferably an elbow having a flared open mouth, adapted for tossing, even with one hand, the caught fish thereinto and provided with clamp or cordage means for anchoring the bag to the gunwale of the boat.

A further feature of the neck-portion, if long, is the provision of a slit preferably reenforced at its lower end and extending preferably longitudinally thereof and provided with a closure means such as a zipper, a lace or buckles. The device may be provided with a grasping handle at its open end for hanging up or carrying the bag with the fish in it.

A feature of the pouch is its preferable pear-shaped body, the wall of which is preferably attenuated from the round closed bottom end to the neck-portion, converging to the neck-portion, whereby the pouch, in a pendant position and submerged in water, has a bulbular form, whereby the fish therein are permitted to swim or float.

Another feature of the pouch is the provision of dispersed apertures in the wall thereof, whereby to permit free circulation of oxygenized water through the pouch for the comfort of the fish therein, but which are of a size adapted to prevent escape of the fish from the pouch.

A further optional feature of the pouch is the provision of nubbins, preferably molded on the outer surface of the pouch between the apertures and spaced from the edges of said apertures. The functions of these nubbins are to permit air to communicate, through the orifices, with the fish from the underside of the pouch, and to space the pouch wall with the fish therein from a hose support to prevent the wall and the fish lying against the orifices in the wall, from picking up dirt from the support.

These and other objects and novel features of this invention will be more clearly and fully set forth in the following specification and claims.

In the drawings forming a part of this specification:

Fig. 1 as illustrated is an elevational view of my invention.

Fig. 2 is a view on line 2—2, Fig. 1.

Fig. 3 is a modification of the upper end-portion of the neck-portion in Fig. 1

Fig. 4 is a fragmentary view on line 4—4, Fig. 1.

In the art of angling, the employment of an elastic sack of such material as rubber or plastic or rubberized fabric sheet material has numerous advantages over the netting sack, such as a bulbular shape to permit the fish to swim without entangling themselves in the netting, resistance to water soaking, to rotting, to impregnation with fish odor, to damage by cigarette stub fire, to gathering of dirt, and to damage in handling of the bag. It also has the advantage of attractiveness and of being better adapted for general utility.

In Figure 1 there is illustrated an angling bag 5 secured to the gunwale of a boat and including a combined pouch 6 and a neck-portion 7. They are illustrated as integrally formed in a unitary piece, but they may be made to be separable. The neck-portion 7 is of a sheet material of substantially the same thickness as the sheet material of the pouch 6.

The neck-portion 7 is illustrated as having an elbow 8 with a flared pliable open mouth 9 forming the upper end thereof, adapted to be placed over the gunwale 11 of a boat to facilitate putting the catch thereinto. The elbow 8 may be dispensed with and the upright end formed in the form of a flared open mouth 9a. The upper end portion of the neck-portion 7 is preferably provided with anchoring means such as a clamp 10 or a cord 10a. The clamp may be of a spring type or of an interlocking type adapted to anchor to the gunwale 11. The spring type as shown includes: a twin-bracket 22 integral with the neck-portion 7 and provided with a bolt or pin 23 between the individual brackets 22; a clevislike spring clamp 24 mounted on the bolt 23.

The neck-portion 7 may be provided with a grasping means 13 adapted to be held in the palm of the hand having an eyelet 14 for suspending the bag when not in use, and it may also be provided with a closure slit 17 reenforced at its lower end, as indicated at 16, and extending up from the open top of the wall sheathing upwardly clear to the end or partially up to the end of the neck-portion. The marginal edges forming the slit 17 may be provided with a zipper, lace, or other closure means 15.

The pouch 6 may also be provided with a handle or grasping means 12, to be used cooperatively with the grasping means 13 and adapted to be held in the palm of the hands and longitudinally aligned with the grasping means 13 of the neck portion for emptying the bag or carrying the same with the fish therein. This grasping means 12 may be adapted for hanging up the bag onto a hook-like element. Dispersed in the wall of the pouch 6, are orifices or apertures 18 of a size adapted to permit water to circulate therethrough and to prevent fish from escaping from the bag.

A plurality of nubbins 19 may be provided in the wall structure of the pouch between the orifices and projecting from the outer surface of said wall. These nubbins are of such size as to permit air to communicate with the fish through the orifices 18 on the underside of the pouch when supported on a smooth surface. This arrangement also reduces the tendency of loose matter on said surface from entering into or adhering on the lower surface of said pouch.

It will be noted that the bag is preferably rounded at the lower end thereof, as illustrated at 20, and tapered to the neck-portion 7 as indicated at 21. Such construction results in the pouch 6 assuming a bulbular form when supported as illustrated in Fig. 1.

Various modifications and changes as contemplated may obviously be resorted to, without departing from the spirit and scope of the invention as hereinafter described by the appended claims.

What I claim is:

1. An angler's bag adapted for use in association with a boat, said bag consisting of semi-rigid material and comprising a bulbular pouch portion adapted to hold fish, a tubiform neck portion suitable for conveyance of fish therethrough and of sufficient length to afford submersion of the said pouch portion when said bag is attached to the gunwale of a boat, and means attached to said neck portion for anchorage to the boat, said pouch being provided with openings for circulation of water therethrough and of such size as to prevent escape of the fish stored within, and the diameter of said bulbular pouch portion being of greater extent than the diameter of said tubular portion.

2. The structure as defined in claim 1 in which the pouch portion is provided with nubbins on the outer side thereof adapted to space said portion from a base when said pouch is lying upon said base, thereby admitting air to the fish and spacing the base portion from the fish.

3. The structure defined in claim 1 in which the neck portion and the pouch are each provided with a hand element, at least one of said hand elements being adapted for hanging up the bag and both together for cooperative manual grasping in pouring out the fish contained in said bag.

4. The structure defined in claim 1 in which the neck portion is provided with closable opening for manual access to the fish in the pouch.

5. The structure defined in claim 1 in which the neck portion and the pouch are, each, provided with a hand element, at least, one of said hand elements being adapted for hanging up the bag and both together for cooperative manual grasping in pouring out the fish from the bag, and in which the neck portion is provided with closable opening for manual access to the said fish.

6. The structure defined in claim 1, in which, the neck portion and the pouch are, each, provided with a hand element, at least, one of said hand elements being adapted for hanging up the bag and both together for cooperative manual grasping in pouring out the fish from the bag, and in which the neck portion is provided with closable opening for manual access to the said fish, and in which, the pouch is provided with nubbins on the outer side thereof, adapted to space said pouch from a base when the pouch is lying upon said base, thereby admitting air to the fish and spacing the base from the fish.

References Cited in the file of this patent

UNITED STATES PATENTS

| Number | Name | Date |
| --- | --- | --- |
| 36,641 | Cantel | Oct. 14, 1862 |
| 113,394 | Brown | Apr. 4, 1871 |
| 636,381 | Hamel | Nov. 7, 1899 |
| 690,854 | Grant | Jan. 7, 1902 |
| 944,940 | Brandon | Dec. 28, 1909 |
| 1,111,937 | Zoulek | Sept. 29, 1914 |
| 1,299,682 | Crist | Apr. 8, 1919 |
| 1,344,187 | McPheeters | May 25, 1920 |
| 1,816,725 | Freeman | July 28, 1931 |
| 1,915,196 | McGuire | June 20, 1933 |
| 1,934,815 | Parrott | Nov. 14, 1933 |
| 2,003,720 | Meek | June 4, 1935 |
| 2,040,559 | Luttrell | May 12, 1936 |
| 2,055,218 | Itczak | Sept. 22, 1936 |
| 2,057,055 | Pratt | Oct. 13, 1936 |
| 2,209,570 | Kraft | July 30, 1940 |
| 2,225,089 | Vdnais | Dec. 17, 1940 |
| 2,346,335 | Sidnell | Apr. 11, 1944 |
| 2,377,311 | Campbell | June 5, 1945 |
| 2,384,101 | Kruse | Sept. 4, 1945 |
| 2,449,513 | Schmidt | Sept. 14, 1948 |

FOREIGN PATENTS

| 408,683 | Great Britain | Apr. 16, 1934 |